United States Patent [19]

Marshall et al.

[11] E Patent Number: Re. 32,623

[45] Reissued Date of Patent: Mar. 15, 1988

[54] CURVED OFFSHORE WELL CONDUCTORS

[75] Inventors: Peter W. Marshall, Houston, Tex.; Peter Arnold, Mandeville, La.; Francis P. Dunn, Kingwood, Tex.

[73] Assignee: Shell Oil Company, Houston, Tex.

[21] Appl. No.: 918,195

[22] Filed: Oct. 14, 1986

Related U.S. Patent Documents

Reissue of:

[64] Reexamination Certificate No.: B1 Re. 28,860
Issued: Sep. 3, 1985
Reexaminations Request No.: 90/000,412
Filed: Jun. 27, 1983
Request No.: 90/000,607
Filed: Aug. 13, 1984

Which is a Reexamination of:

[64] Patent No.: Re. 28,860
Issued: Jun. 15, 1976
Appl. No.: 326,706
Filed: Jan. 26, 1973

Which is a Reissue of:

[64] Patent No.: 3,687,204
Issued: Aug. 29, 1972
Appl. No.: 70,101
Filed: Sep. 8, 1970

[51] Int. Cl.[4] ..... E21B 7/04; E21B 7/136; E21B 17/00

[52] U.S. Cl. ..... 175/9; 166/366; 175/61; 405/195

[58] Field of Search ..... 175/5, 7, 8, 9; 166/362, 366; 405/195

[56] References Cited

U.S. PATENT DOCUMENTS

| | | | |
|---|---|---|---|
| 2,565,794 | 9/1951 | Young | 175/61 |
| 2,783,027 | 2/1956 | Gilbert . | |
| 3,004,612 | 10/1967 | Kofahl . | |
| 3,315,473 | 4/1967 | Hauber et al. | 405/227 |
| 3,451,493 | 6/1969 | Storm | 175/9 |
| 3,488,967 | 1/1970 | Toossi | 405/210 |

OTHER PUBLICATIONS

"Cumulative Fatigue Damage of Drill Pipe in Dog Legs" by J. E. Hansford and A. Lubinski, Journal of Petroleum Technology, Mar. 1966, pp. 359–363.

Conoco Drawing Nos. R-1003-0, 9, 10; R 1002-0, 7, 8, 9, 10; R-1010-1A, 2A, 3A, 3 5A, 6A, 7A, 8A, 9A, 10A; and R-1012-1, 2, 3, 4, 5, 7 and 8.

Drawing; SMI 108B; E, 1, 269A; G1. 32v6 G.I. 41A-prepared by Conoco.

*Primary Examiner*—James A. Leppink
*Assistant Examiner*—William P. Neuder

[57] ABSTRACT

Apparatus and method for producing hydrocarbons from a subterranean hydrocarbon-bearing formation located beneath the floor of a body of water. A platform structure is installed on the floor over the formation and well conductors are extended down the structure and penetrate into the floor of the body of water. The conductors may include an upper vertical portion, then continually curve downwardly and outwardly through the structure above the floor in a manner maintaining a relatively smooth bore throughout the entire extent of the conductors. The conductors are extended into the floor of the body of water and wells are drilled, via the conductors, down into communication with the formation. Formation fluids are then produced from the formation via the conductors.

31 Claims, 3 Drawing Figures

CURVED OFFSHORE WELL CONDUCTORS

Matter enclosed in heavy brackets [ ] appears in the original patent but forms no part of the first reissue and/or reexamination certificate; matter printed in italics indicates the additions made by the first reissue and/or reexamination certificate. Matter enclosed in double heavy brackets [[ ]] appears in the first reissue and/or reexamination certificate but forms no part of this reissue specification; matter printed in bold face indicates the additions made by this reissue.

BACKGROUND OF THE INVENTION

1. Field of the Invention

The invention relates to the drilling of wells offshore; and, more particularly, to a method and apparatus for producing hydrocarbons from subterranean formations under the ocean floor.

2. Description of the Prior Art

In an attempt to locate new oil fields, an increasing amount of well drilling has been conducted at offshore locations, such, for example, as off the coasts of California, Louisiana and Texas, and more recently, off the coast of Alaska and in the North Sea. Generally, platform structures are installed on the ocean floor and straight well conductors are extended from the platform structure some distance below the ocean floor, providing guidance and support for wells drilled into hydrocarbon-bearing reservoirs.

In order to increase the lateral reach of such well conductors, these conductors have been slanted from the vertical, as for example, in a U.S. Pat. No. 3,451,493 to Storm. Such conductors are usually extended laterally beyond the perimeter of a conventional platform structure at a considerable distance above the mudline (e.g., about 100 to 150 feet in 250-foot water depth), This condition is undesirable since it results in long spans of well conductors which are unsupported or which require fabrication of conductor guides outside of the main framework of the platform structure. Such an arrangement is both costly and complicated. Further, if such well conductors are to perform as a portion of the platform structure foundation by providing resistance to lateral movement, the cost of the outrigged framework is considerably increased.

An alternate type of arrangement in applying such straight-slant type conductors to deep water conditions is to keep the portion of the conductor which is above the mudline inside the framework of the platform by crisscrossing them in a vertical plane. The wellhead for each well conductor is located at the top of the platform structure on one side thereof and the bottom well conductor platform support is located at the mudline near the opposite side of the platform structure. Such an arrangement requires that a large part of the deck area of the platform structure be designed to accommodate the required slant drilling rig since the wellheads are not located together. Unless the layout of the platform structure is axisymmetric, this latter technique may result in an undesirable well conductor reach pattern. Moreover, a special slant drilling rig must be used rather than the conventional straight rig.

Thus, the disadvantages of such prior art arrangements for increasing horizontal reach are conductor guides external of the platform structure, possible interference of conductors with the platform structure foundation, non-centrally located wellheads, possibly undesirable well conductor reach patterns, and the need for a special rig. These disadvantages become especially significant in water deeper than 200 feet.

SUMMARY OF THE INVENTION

It is an object of this invention to provide apparatus and method for drilling offshore wells using well conductors having increased lateral reach from platform structures installed on the floor of a body of water.

It is a further object of this invention to provide such well conductors wherein the conductors and guides are framed inside of the main framework of the platform structure.

It is a still further object of this invention to increase the lateral reach of such conductors with the ability to provide any desired pattern with respect to the platform structure, depending upon the reservoir.

It is an even further object of this invention to carry out the techniques disclosed herein without significantly altering the design or operation of conventional platform structures and drilling rigs.

These and other objects may be accomplished by installing a platform structure on the floor of a body of water over a subterranean hydrocarbon-bearing formation below the floor and extending well conductors down the structure and beneath the floor of the body of water. The conductors may include an upper vertical portion, then continually curve downwardly and outwardly through the structure above the floor in a manner maintaining a relatively smooth bore throughout the entire extent of the conductors. The conductors are extended into the floor beneath the structure and wells are drilled via the conductors down into the formation. Formation fluids are then produced from the formation via the conductors.

In addition to the above mentioned objects, a further purpose in employing curved conductors is to minimize the possibility of inadvertently drilling into a previously drilled well. The further apart the conductors are spread at the bottom of the structure, the less likelihood there is of drilling into one wellbore while drilling another well.

DESCRIPTION OF THE PREFERRED EMBODIMENT

Figure 1:
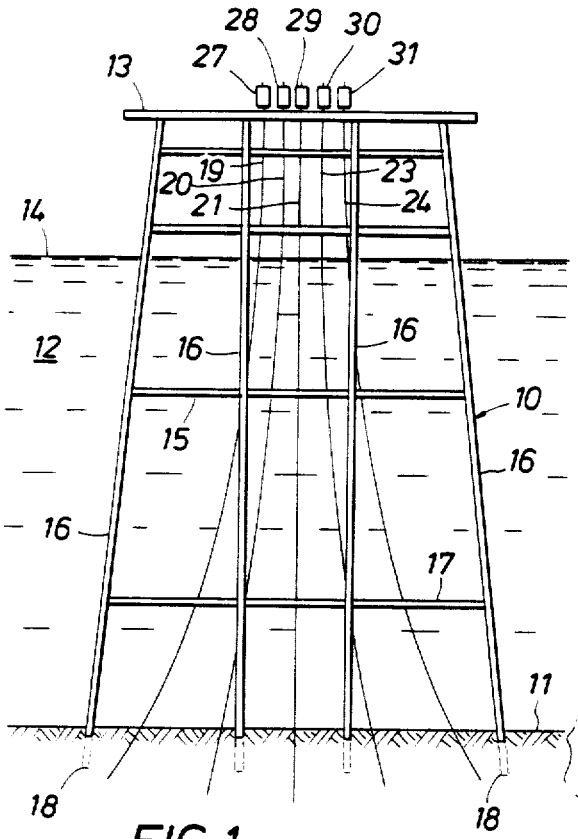
FIG. 1 is a vertical view of a platform structure resting on the floor of a body of water and having well conductors installed thereon in accordance with the teachings of our invention.
Figure 2:
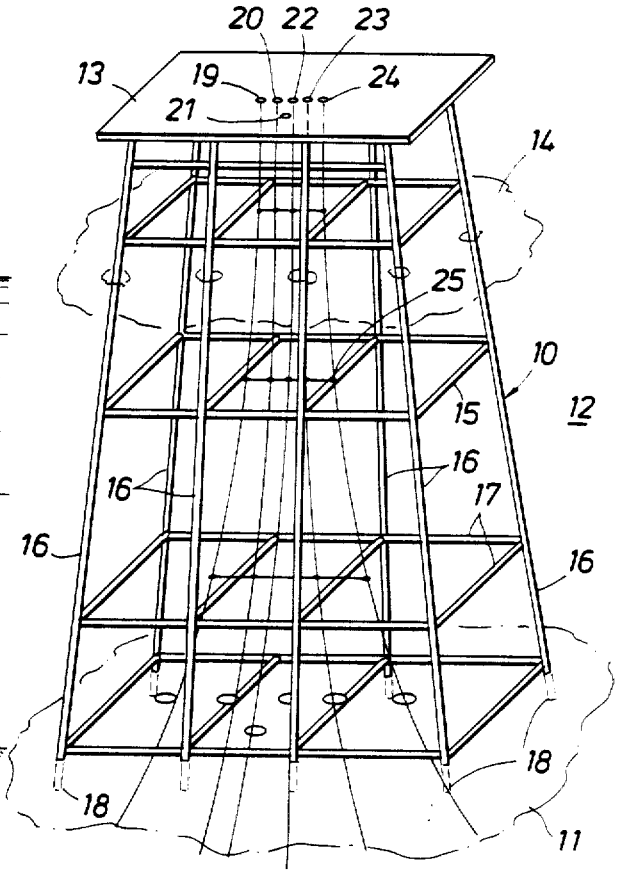
FIG. 2 is a perspective view of the platform structure of FIG. 1 showing well conductor guides on the structure for accommodating the curvature of the well conductors in accordance with the teachings of our invention.

Referring to both FIGS. 1 and 2, a conventional platform structure 10 is shown resting on the floor 11 of a body of water 12. Structure 10 includes a generally horizontal work platform 13 thereon supported above the water surface 14 by suitable framework 15. Framework 15 preferably includes a plurality of legs 16 interconnected by a network of cross-bracing members 17. The lower ends of legs 16 extend into the floor 11 and are anchored therein by suitable piles 18. It is to be understood that conventional well equipment, such as derricks, draw works, engines, etc., (not shown) may be installed on work platform 13.

In accordance with our invention, a plurality of well conductors are extended from platform 13 along framework 15 to the floor 11 of the body of water 12.

For example, six such conductors 19 through 24 are shown in FIGS. 1 and 2 (conductor 22 not being visible in FIG. 1). Thus, conductor 22 may extend substantially vertical with respect to platform structure 10. However, conductors 19, 20, 21, 23 and 24 extend first vertically downwardly with respect to platform structure 10 then continually curve downwardly and outwardly in any desired pattern as illustrated in FIGS. 1 and 2.

Although only six such well conductors are shown extending from platform 13, obviously a plurality of such conductors may be provided, so arranged with respect to platform structure 10 so as to provide an optimum lateral reach in the desired directions from the structure 10.

The curvature applied to conductors 19, 20, 21, 23 and 24 may be constant or varying; however, in either case, a smooth bore is provided throughout substantially the entire extent of the conductors thereby permitting sharper curvatures than may normally be permitted when drilling into the floor 11. In this manner, the early attainment of high angles of deviation increases the lateral reach of the well conductors while retention of conventional vertical drilling techniques is permitted by having the curved conductors vertical at their top ends.

Preferably, the conductors are supported at intervals along platform structure 10 by conductor guides 25 (FIG. 2) built into the platform structure 10 so as to accommodate the curvature of the conductors. These guides 25 have been omitted in FIG. 1 for convenience of illustration. As shown in FIG. 2, guides 25 may take the form of ring elements or the like secured to the legs 16 or framework 15 of platform structure 10 at a plurality of staggered offset locations. These guides 25 provide guidance and support for the conductors. Curvature may be imparted to the conductors by [performing] *preforming* the conductors and/or by elastically bending the conductors during installation through the series of slightly offset guides 25. The preformed or plastically-bent conductors may be used to continue building angle below the bottom conductor guides 25 (generally at the mudline or floor 11). Conventional drilling, jetting, driving, or a combination of these techniques may be used to install the conductors through floor 11. Further, the curved well conductor provides continuous support for casing and tubing which can be conventionally drilled into communication with subterranean reservoir 26 shown schematically in FIG. 3. Additionally, conductors 19 through 24 may or may not double as piling, as is well known in the drilling art, to support platform structure 10.

Figure 3:
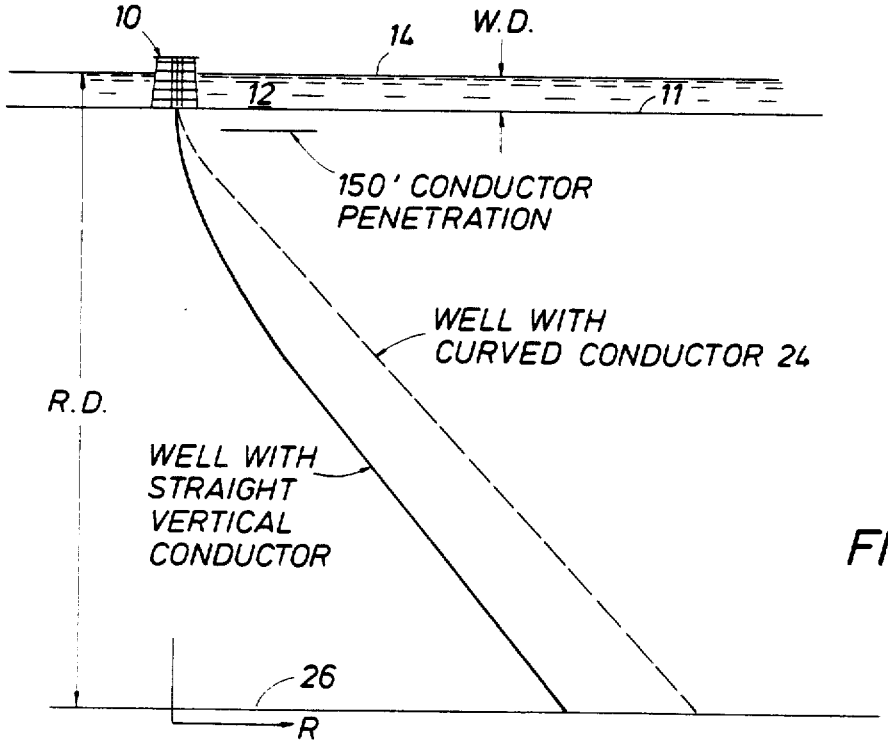
FIG. 3 is a vertical, partly graphic, view showing the advantages of the teachings of our invention over conventional prior art vertical riggings.

Thus, as can be seen in FIG. 3, one of the curved conductors, (e.g., conductor 24) is shown adjacent a conventional prior art "straight" vertical conductor. As can be seen, the lateral reach capability of the well conductors is increased when such conductors are continually curved when drilled with respect to a single platform structure 10. The techniques of our invention are particularly well suited for combined conditions of deep water (i.e., a water depth or W.D. of between 200 and 400 feet or so) and shallow reservoir depth (i.e., a reservoir depth or R.D. of about 5,000 feet more or less). When compared with known prior art techniques, as, for example, the "straight" vertical conductor of FIG. 3 which is shown as having been driven to 150 foot penetration with the wellbore deviated horizontally from that point, curved conductor 24, having a moderate curvature of, for example, six degrees every 100 feet or so, nearly doubles the acreage that can be reached from the single platform structure 10.

Thus, in drilling wells in accordance with the techniques of our invention, a slant rig is not required since the wells may be drilled using conventional vertical-type equipment. Additional deck space on platform 13 which may be necessary to move and operate a slant rig is not required nor is special designing of platform 13 to accommodate such a rig necessary. Finally, as shown in FIG. 1, conventional wellhead equipment 27 through 31 may be associated with conductors 19, 20, 21, 23 and 24 (the equipment associated with conductor 22 not being visible in FIG. 1) for recovering formation fluids produced from the reservoir 26 of FIG. 3. This equipment may be clustered in a central location on the platform 13, of platform structure 10 of the same spacing and shape as is conventionally required for producing formation fluids from "Straight" vertical conductors.

In summary, the curved conductors of our invention may be designed to nearly match or exceed (depending on water depth) the reach capability of conventional slant conductors without the inherent disadvantages of the latter, i.e., the conductors and guides may be framed inside the platform structure, the framing at the mudline may economically be designed to enable the curved conductor to function as part of the platform foundation system and so as not to interfere with the installation, the well head equipment may be centrally located, and any desired reach pattern may be achieved. Further, the curved conductors may be installed and wells may be drilled using conventional vertical-type equipment and techniques. For deep water-shallow reservoir conditions, the curved conductor may be installed and operated without significantly altering the design or operation of the platform from that which is conventionally used for straight-vertical conductors. The curved conductors of our invention may be used in combination with straight vertical conductors to greatly increase the number of wells which can be drilled from a single platform structure.

We claim as our invention:

1. A method for producing hydrocarbons from a subterranean hydrocarbon-bearing formation located beneath the floor of a body of water, said method comprising the steps of:

installing a platform structure on the floor of said body of water above said formation;

extending at least one well conductor downwardly [with respect to] *within* said platform structure, then curving said conductor *from a normally vertical position within said platform structure* outwardly and downwardly through a *portion of the vertical height of* said platform structure above the floor of said body of water *and thence entering the floor of the body of water along a* [[*curved*]] *path* in a manner maintaining a relatively smooth bore throughout substantially the entire extent of said conductor;

drilling via said conductor down through said floor and into fluid communication with said formation; and producing formation fluids from said formation via said conductor.

2. The method of claim 1 wherein the step of curving said conductor includes the steps of:

providing guide means at a plurality of vertically spaced locations on said platform structure *and increasingly horizontally offset at each lower location* adapted to curve said conductor *from a normally vertical position;* and extending said conductor into communication with said guide means thereby curving said conductor through said guide means.

3. The method of claim 1 wherein the step of extending at least one well conductor downwardly with respect to said platform structure includes the step of extending a plurality of well conductors downwardly [with respect to] *through and within* said platform, at least some of said well conductors being extended outwardly and downwardly with respect to said platform structure in a direction different from that of an adjacent well conductor in a predetermined pattern with respect to said platform structure.

4. The method of claim 1 wherein the step of curving said conductor includes the step of continually curving said conductor up to approximately 6° every 100 feet.

5. The method of claim 1 wherein the step of curving said conductor includes the step of pre-forming the desired curvature in said conductor prior to the step of extending said conductor downwardly [with respect to] *through and within* said platform structure.

6. The method of claim 1 wherein the step of extending said well conductor downwardly with respect to said platform structure includes the step of extending the upper portion of said conductor first vertically downwardly [with respect to] *through and within* said platform structure, then curving said conductor *within the platform structure above the floor of the body of water.*

7. Apparatus for producing hydrocarbons from a subterrean hydrocarbon-bearing formation located beneath the floor of a body of water, said apparatus comprising:

a platform structure disposed on the floor of said body of water;

at least one well conductor extending downwardly [with respect] *within* to said platform structure, then *from a normally vertical position within said platform structure being curved outwardly* and downwardly through *at least a portion of the vertical height of* said platform structure [above] *and out the bottom thereof at* the floor of said body of water *and thence entering the floor of the body of water along a* [[*curved*]] *path,* said conductor having a relatively smooth bore throughout substantially the entire extent thereof;

a drilled well communicating with both said conductor and said formation; and formation fluids recovery means associated with said conductor for recovering formation fluids produced from said formation via said conductor.

8. The apparatus of claim 7 wherein said platform structure includes a plurality of conductor guide means disposed vertically thereof *and increasingly horizontally offset at each lower location* for curving said conductor and said conductor engages said guide means in a manner curving said conductor.

9. The apparatus of claim 7 including a plurality of said conductors extending downwardly [with respect to] *through and within* said platform structure, at least some of said conductors extending outwardly and downwardly with respect to said platform structure in a direction different from that of an adjacent well conductor in a predetermined pattern with respect to said platform structure.

10. The apparatus of 7 wherein said conductor continually curves approximately up to 6° every 100 feet.

11. The apparatus of claim 7 wherein said well conductor extends first vertically downwardly [with respect to] *within* said platform structure, then curves outwardly and downwardly *to enter the floor of the body of water along a curved path.*

12. The apparatus of claim 7 wherein said conductors extending downwardly [with respect to] *along a curvilinear path within* said platform structure extend below said platform structure and into the floor of said body of water.

*13. An anchored marine structure at an offshore body of water adapted for directional drilling of under-water wells which comprises:*

*a working deck positioned above the water's surface and holding well drilling equipment;*

*at least one elongated leg supportably connected to said working deck and extending downwardly to the floor of said body of water;*

*pile means connected to said structure and depending from the lower end thereof being imbedded in the substratum of said body of water to rigidly fix said structure in place;*

*conductor guide means carried on said structure and being adapted to slidably receive and deflect a drill guide conductor passed downwardly therethrough;*

*said conductor guide means including, discrete guide units spaced vertically apart in substantial vertical alignment and being deviated horizontally from said substantially vertical alignment to define an arcuate center line along the common axis of said respective guide units.*

*14. In an apparatus as defined in claim 13 including; an elongated cylindrical conductor registered in said substantially vertically aligned discrete guide units, said cylindrical conductor being deformed thereby into an arcuate configuration.*

*15. A method of installing a curved well conductor at an offshore location having a platform structure installed on the floor of a body of water, said method comprising:*

*extending with a downward movement at least one well conductor open at both ends downwardly with respect to said platform structure, then curving said conductor outwardly and downwardly through said platform structure within a plan view periphery thereof and above the floor of said body of water in a manner maintaining a relatively smooth bore throughout substantially the entire extent of said conductor.*

16. The method of claim 15 wherein the step of curving said conductor includes the steps of:

providing guide means at a plurality of vertically spaced locations on said platform structure *and increasingly horizontally offset at each lower location* adapted to curve said conductor *from a normally vertical position;* and extending said conductor into communication with said guide means thereby curving said conductor through said guide means.

*17. The method of claim 16 including the step of continuing the extending of the curved well conductor along its curve path and into the floor of the body of water.*

*18. The method of claim 17 including the step of conducting well drilling operations through said well conductor.*

19. The method of claim 15 wherein the step of extending at least one well conductor downwardly with respect to said platform structure includes the step of extending a plurality of well conductors downwardly [with respect to] *through and within* said platform, at least some of said well conductors being extended outwardly and downwardly with respect to said platform structure in a direction different from that of an adjacent well conductor in a predetermined pattern with respect to said platform structure.

*20. The method of claim 15 wherein the step of curving said conductor includes the step of continually curving said conductor up to approximately 6° every 100 feet.*

21. The method of claim 15 wherein the step of curving said conductor includes the step of pre-forming the desired curvature in said conductor prior to the step of extending said conductor downwardly [with respect to] *through and within* said platform structure.

22. The method of claim 15 wherein the step of extending said well conductor downwardly with respect to said platform structure includes the step of extending the upper portion of said conductor first vertically downwardly [with respect to] *within* said platform structure, then curving said conductor.

23. Apparatus for use in drilling offshore wells to increase the lateral reach of the wells, said apparatus comprising:

a platform structure disposed on the floor of a body of water; and at least one well conductor through which a well may be drilled, said conductor extending downwardly [with respect to] *within* said platform structure, then curved [for the major portion thereof] outwardly and downwardly through said platform structure *and out the bottom thereof* within the plan view periphery thereof [above] *at* the floor of said body of water, said conductor having a relatively smooth bore throughout substantially the entire extent thereof.

24. The apparatus of claim 23 wherein said platform structure includes a plurality of conductor guide means disposed vertically thereof within the plan view periphery of said platform structure *and being increasingly horizontally offset at each lower location* for curving said conductor *from a normally vertical position* and said conductor engages said guide means in a manner curving said conductor.

25. The apparatus of claim 23 including a plurality of said well conductors extending downwardly [with respect to] *through* said platform structure within the plan view periphery thereof, at least some of said conductors extending outwardly and downwardly [with respect to] *entirely within* said platform structure in a *curvilinear* direction different from that of an adjacent well conductor in a predetermined pattern with respect to said platform structure.

*26. The apparatus of claim 23 wherein said conductor continually curves approximately up to 6° every 100 feet.*

27. The apparatus of claim 23 wherein said well conductor extends first vertically downwardly with respect to said platform structure, then curves outwardly and downwardly *through and within said platform along a curvilinear path.*

28. The apparatus of claim 23 wherein said well conductors extending downwardly with respect to said platform structure extend below said platform structure and into the floor of said body of water *along a curved path.*

29. A marine structure, adapted to be positioned on the floor of a body of water, for the directional drilling of underwater wells, which comprises:

a substantially rigid structure of a height, when assembled, greater than the depth of water in which said marine structure is to be positioned, means carried by said marine structure for receiving anchoring means for anchoring said structure to the floor of said body of water, and conductor pipe guide means carried by said structure *entirely* within the plan view periphery thereof *and at least a portion of said guide means being arranged along a downwardly curved path* to receive a drill guide conductor pipe adapted to pass downwardly therethrough along a path [the major portion of] which curves outwardly and downwardly [through] *within* said marine structure.

*30. The marine structure of claim 29 wherein said conductor pipe guide means includes a plurality of discrete guide units spaced vertically apart and being off-set horizontally from the vertical to define an arcuate line taken through the centers of successive guide means.*

*31. A marine structure, adapted to be positioned on the floor of a body of water, for the directional drilling of underwater wells, which comprises:*

*a substantially rigid structure of a height, when assembled, greater than the depth of water in which said marine structure is to be positioned;*

*means carried by said marine structure for receiving anchoring means for anchoring said structure to the floor of said body of water; and*

*conductor pipe guide means carried by said structure within the plan view periphery thereof to receive a drill guide conductor pipe adapted to pass downwardly therethrough along a path the major portion of which curves outwardly and downwardly through said marine structure.*

* * * * *